United States Patent
Une

(10) Patent No.: US 10,718,416 B2
(45) Date of Patent: Jul. 21, 2020

(54) FRONT COVER ASSEMBLY

(71) Applicant: EXEDY Corporation, Neyagawa-shi, Osaka (JP)

(72) Inventor: Takuya Une, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

(21) Appl. No.: 16/277,252

(22) Filed: Feb. 15, 2019

(65) Prior Publication Data
US 2019/0277381 A1 Sep. 12, 2019

(30) Foreign Application Priority Data
Mar. 9, 2018 (JP) .................. 2018-043609

(51) Int. Cl.
*F16H 41/28* (2006.01)
*F16H 41/04* (2006.01)

(52) U.S. Cl.
CPC .............. *F16H 41/28* (2013.01); *F16H 41/04* (2013.01)

(58) Field of Classification Search
CPC .......... F16H 41/04; F16H 41/28; F16H 41/24; F16F 15/1215
See application file for complete search history.

(56) References Cited

U.S. PATENT DOCUMENTS

2003/0056859 A1 * 3/2003 Hanyuda ................. C22C 38/04
148/319
2011/0315498 A1 12/2011 Karamavruc et al.

FOREIGN PATENT DOCUMENTS

| JP | 64-036754 U1 * | 3/1989 |
| JP | S64-036754 U1 | 3/1989 |
| JP | 2014-098469 A | 5/2014 |
| JP | 2016-100944 A | 5/2016 |
| JP | 2018-003919 A | 1/2018 |

OTHER PUBLICATIONS

Notice of Allowance of the corresponding Japanese Application No. 2018-043609, dated Jan. 28, 2020, 3 pp.

* cited by examiner

Primary Examiner — Abiy Teka
(74) Attorney, Agent, or Firm — United IP Counselors, LLC

(57) ABSTRACT

A front cover assembly is disclosed. The front cover assembly includes a front cover body having a disc shape and a hub having a tubular shape. The front cover body includes a tubular portion in a center part thereof. The tubular portion is closed at one end thereof. The hub includes an engaging portion integrated with at least part of an outer peripheral surface thereof. The hub includes a coupling portion configured to extract power on an inner peripheral surface thereof. The engaging portion is press-fitted to the tubular portion of the front cover body.

8 Claims, 2 Drawing Sheets

FRONT COVER ASSEMBLY

CROSS-REFERENCE TO RELATED APPLICATIONS

This application claims priority to Japanese Patent Application No. 2018-043609, filed Mar. 9, 2018. The contents of that application are incorporated by reference herein in their entirety.

TECHNICAL FIELD

The present invention relates to a front cover assembly, particularly to a front cover assembly for transmitting power inputted thereto to a torque converter body.

BACKGROUND ART

Torque converters include a front cover coupled to an engine-side member and a torque converter body fixed at an impeller shell thereof to the front cover. For example, a drive plate fixed to a crankshaft of an engine is fixed to the front cover. In other words, power from the engine is inputted to the front cover. Hence, the front cover is provided with, for instance, a coupling portion for extracting power for driving an oil pump.

Japan Utility Model Application Publication No. S64-36754 describes a torque converter including such a front cover as described above. The front cover described in Japan Utility Model Application Publication No. S64-36754 includes a spline hole in the center part thereof, and a spline shaft for driving a pump is coupled to the spline hole.

In an example shown in FIG. 1 of Japan Utility Model Application Publication No. S64-36754, the front cover is provided with the spline hole in the center part thereof, and a front boss having a bag shape is welded to the engine-side lateral surface of the front cover so as to close the spline hole. However, in the configuration herein described, welding is required and there is a large number of processing steps.

Additionally, in an example shown in FIG. 5 of Japan Utility Model Application Publication No. S64-36754, the front boss is integrated with the front cover by stamping. However, in the configuration herein described, forming the spline hole is quite difficult, and a spline-coupled portion cannot be formed with high strength and high accuracy.

BRIEF SUMMARY

It is an object of the present advancement to enable providing a front cover with a coupling portion for extracting power in a lesser number of processing steps and enable forming the coupling portion with high strength and high accuracy.

(1) A front cover assembly according to the present advancement is provided for transmitting power inputted thereto to a torque converter body. The front cover assembly includes a front cover body and a hub. The front cover body has a disc shape and includes a tubular portion in a center part thereof. The tubular portion is closed at one end thereof. The hub has a tubular shape. The hub is provided with an engaging portion integrated with at least part of an outer peripheral surface thereof, and also includes a coupling portion for extracting the power on an inner peripheral surface thereof. The engaging portion is press-fitted to the tubular portion of the front cover body.

The front cover assembly is herein composed of the front cover body and the hub. In other words, the hub is provided separately from the front cover body. The hub is press-fitted to the tubular portion that is provided in the front cover body and is closed at one end thereof. Hence, the hub can be provided with the coupling portion, axially penetrating therethrough, on the inner peripheral surface thereof. Because of this, processing for forming the coupling portion is made easy. Moreover, due to a reason similar to the above, the coupling portion can be realized with high strength and high accuracy. Furthermore, the hub is fixed to the front cover body by press-fitting of the engaging portion. Hence, a welding step is not required.

(2) Preferably, the tubular portion has an inner peripheral surface formed by cutting. In other words, it is not required to form a spline hole or so forth on the inner peripheral surface of the tubular portion. Therefore, processing of the tubular portion is made easy.

(3) Preferably, the engaging portion of the hub has a higher surface hardness than the inner peripheral surface of the tubular portion. In this case, the engaging portion has a higher hardness than the inner peripheral surface of the tubular portion. Hence, when the hub is press-fitted to the front cover body, this press-fitting can be easily done.

(4) Preferably, the hub is provided with the engaging portion on a part thereof separated from a bottom portion of the tubular portion in an axial direction. Additionally, the hub is provided with a pocket portion on the outer peripheral surface thereof. The pocket portion is disposed closer to the bottom portion of the tubular portion than the engaging portion. The pocket portion accommodates powder rasped in press-fitting the hub to the tubular portion.

In press-fitting the hub to the tubular portion, the inner peripheral surface of the tubular portion is rasped by the engaging portion of the hub, whereby rasped powder is produced. The rasped powder is accommodated in the pocket portion provided on the hub. Because of this, the rasped powder can be avoided from being trapped and residing in the interior of the torque converter body.

(5) Preferably, the engaging portion and the pocket portion are continuously provided in the axial direction. In this case, the rasped powder, produced in press-fitting the engaging portion to the tubular portion, can be reliably accommodated in the pocket portion.

(6) Preferably, the pocket portion is an annular recess.

(7) Preferably, the hub closely makes contact at an axial end surface thereof with a bottom surface of the tubular portion. In this case, the end surface of the hub and the bottom surface of the tubular portion closely make contact with each other. Hence, a seal portion is formed by this contact portion. Consequently, the rasped powder, even if exiting from the pocket portion, can be inhibited from flowing toward the torque converter body.

(8) Preferably, the engaging portion is formed by knurling.

Overall, in the present advancement described above, a front cover can be provided with a coupling portion for extracting power without increasing the number of processing steps. Besides, the coupling portion can be formed with high strength and high accuracy.

DETAILED DESCRIPTION

[Entire Configuration]

Figure 1:
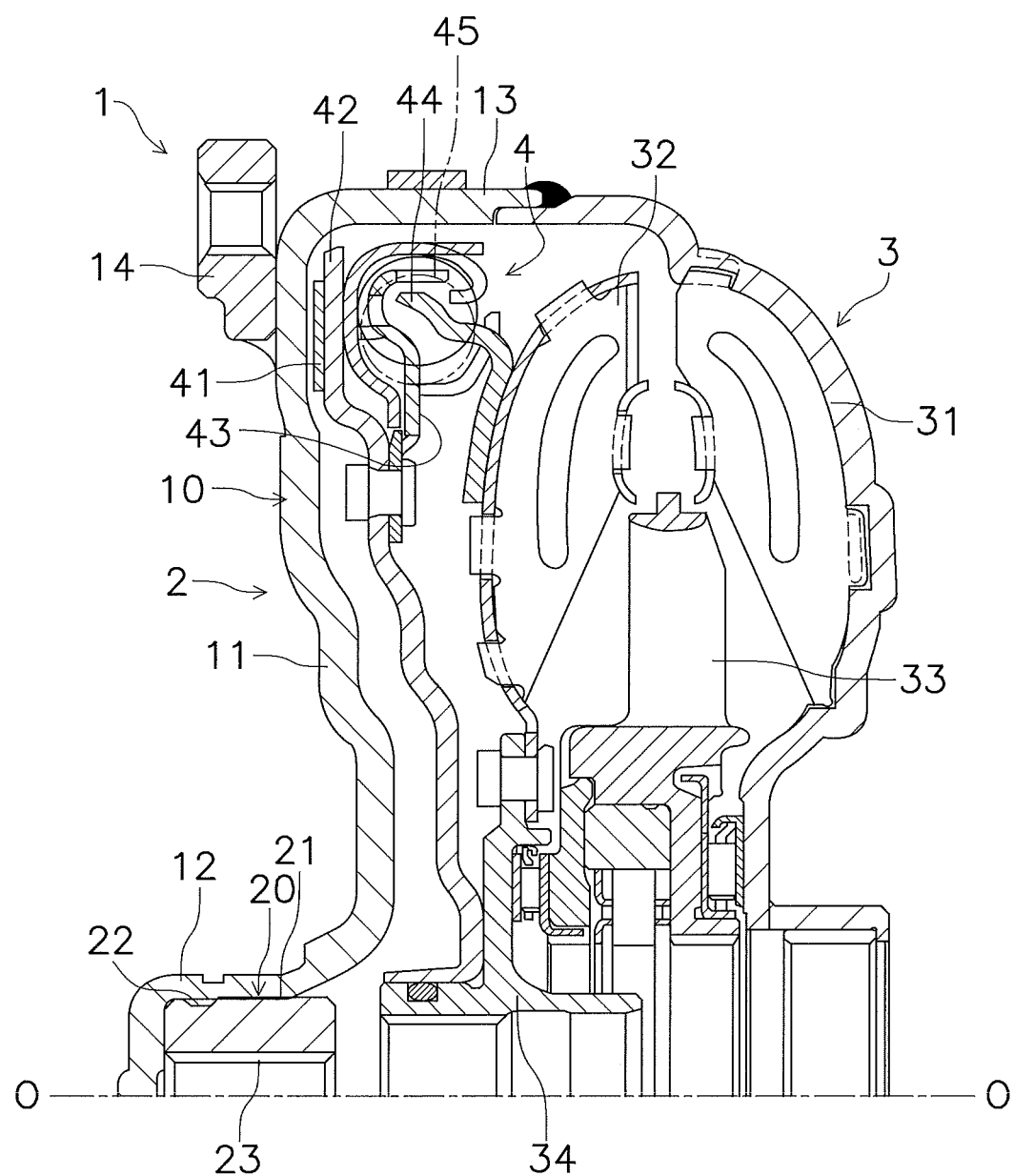
FIG. 1 is a cross-sectional view of a torque converter including a front cover assembly according to a preferred embodiment of the present disclosure.

FIG. 1 is a cross-sectional view of a torque converter 1. In FIG. 1, an engine (not shown in the drawing) is disposed on the left side whereas a transmission (not shown in the drawing) is disposed on the right side. In FIG. 1, line O-O indicates a rotational axis of the torque converter 1.

The torque converter 1 includes a front cover assembly 2, a torque converter body 3 and a lock-up device 4.

[Front Cover Assembly 2]

The front cover assembly 2 is fixed to a drive plate (not shown in the drawings) coupled to an engine-side member, and transmits power from the engine to the torque converter body 3. The front cover assembly 2 includes a front cover body 10 and a hub 20.

The front cover body 10 is formed by stamping of a plate-shaped member and includes a disc portion 11, an inner tubular portion 12 (exemplary tubular portion) and an outer tubular portion 13. The surface of the front cover body 10 has not been hardened by heat treatment.

At least one nut member 14 is fixed to the outer peripheral part of the disc portion 11. The torque converter 1 is fixed to the drive plate by the at least one nut member 14 and at least one bolt (not shown in the drawings).

Figure 2:
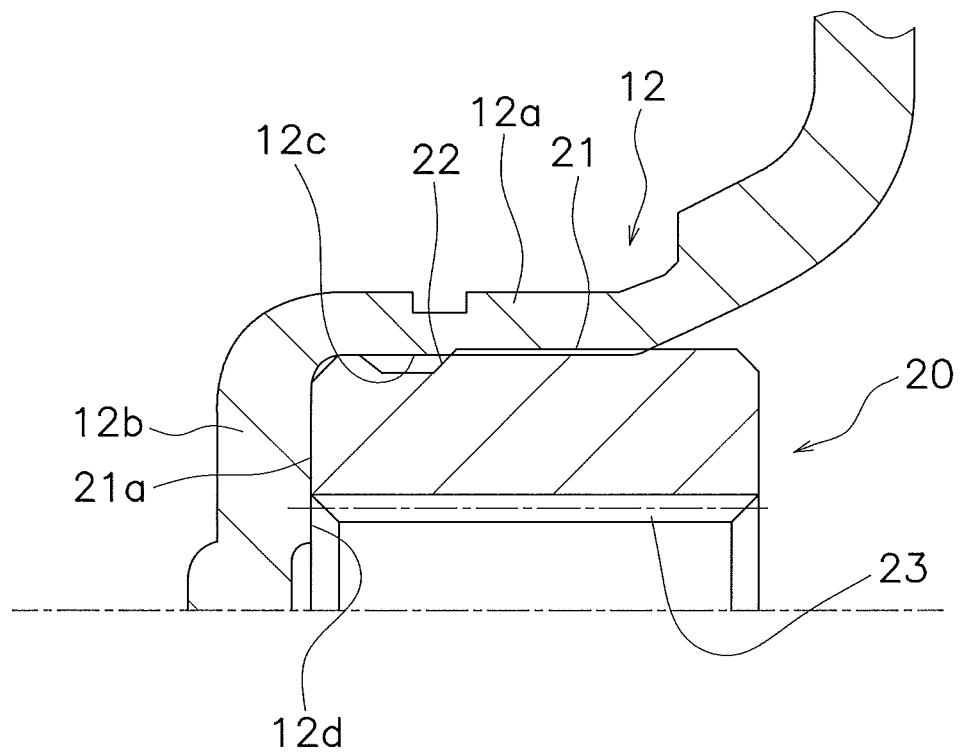
FIG. 2 is an enlarged view of part of FIG. 1.

The inner tubular portion 12 is formed by extruding the center part of the disc portion 11 toward the engine. The inner tubular portion 12 is closed at the engine-side end and has a bag shape. As shown in an enlarged view of FIG. 2, the inner tubular portion 12 includes a tubular portion 12a and a bottom portion 12b. An inner peripheral surface 12c of the tubular portion 12a is formed as a highly accurate circumferential surface by lathe cutting.

The outer tubular portion 13 is formed by bending the outer peripheral part of the disc portion 11 toward the transmission. The torque converter body 3 is fixed to the distal end of the outer tubular portion 13 by welding.

The hub 20 has a tubular shape and is press-fitted in part, from the distal end thereof to approximately two-thirds the axial length thereof, to the inner tubular portion 12 of the front cover body 10. In the hub 20, the part press-fitted to the inner tubular portion 12 is provided with a knurled portion 21 (exemplary engaging portion) and a pocket portion 22 in this order from the transmission side. Additionally, the hub 20 is provided with a spline hole 23 (exemplary coupling portion) in the inner peripheral part thereof. The spline hole 23 penetrates the hub 20 in the axial direction. The surface of the hub 20 is hardened by carburizing. In other words, the outer peripheral surface of the hub 20 has a higher hardness than the inner peripheral surface of the inner tubular portion 12.

The knurled portion 21 is a portion, the outer peripheral surface of which is knurled. The pocket portion 22 is provided continuously to and on the engine side of the knurled portion 21. The pocket portion 22 is an annular recess. A shaft for driving an oil pump (not shown in the drawings) is spline-coupled to the spline hole 23. The spline hole 23 is formed by processing the hub 20 alone before the hub 20 is press-fitted to the front cover body 10.

Additionally, a surface 21a of the axial end of the hub 20 closely makes contact with a surface 12d of the bottom portion 12b of the inner tubular portion 12 (the bottom surface of the inner tubular portion 12). In other words, the end surface 21a of the hub 20 and the bottom surface 12d of the inner tubular portion 12 compose a seal portion.

[Manufacturing of Front Cover Assembly 2]

The front cover body 10 and the hub 20 are separately processed. Specifically, the front cover body 10 is processed by stamping of a plate-shaped member. Additionally, the inner peripheral surface 12c of the inner tubular portion 12 is processed by lathe cutting.

The hub 20 is processed by broaching or so forth so as to form the spline hole 23 in the inner peripheral part thereof. Additionally, the hub 20 is processed by knurling so as to form the knurled portion 21 on the outer peripheral surface thereof, and is also processed by lathe cutting so as to form the pocket portion 22 and the end surface 21a. Thereafter, the surface of the hub 20 is hardened by carburizing.

The hub 20, formed as described above, is press-fitted to the inner tubular portion 12 of the front cover body 10. At this time, the hub 20 is press-fitted thereto while rasping the inner peripheral surface of the inner tubular portion 12 by the knurled portion 21. In this press-fitting, the inner peripheral surface of the inner tubular portion 12 is rasped, whereby rasped powder is produced. The rasped powder is transferred downstream of the knurled portion 21 in the press-fitting direction (i.e., to the engine side of the knurled portion 21), and is accommodated in the pocket portion 22. Therefore, the rasped powder can be inhibited from intruding into the interior of the torque converter body 3.

Additionally, the end surface 21a of the hub 20 closely makes contact with the bottom surface 12d of the inner tubular portion 12, and this portion functions as the seal portion. Therefore, the rasped powder, even if not accommodated in the pocket portion 22, can be prevented from flowing out toward the torque converter body 3.

[Torque Converter Body 3]

The torque converter body 3 has a heretofore known structure, and mainly includes an impeller 31, a turbine 32 and a stator 33. As described above, the outer peripheral part of the impeller 31 is welded to the outer tubular portion 13 of the front cover body 10, whereby a fluid chamber is formed by the front cover body 10 and the impeller 31. The turbine 32 is disposed in opposition to the impeller 31, and is coupled at a turbine hub 34 provided as the inner peripheral part thereof to a main drive shaft (not shown in the drawings) of the transmission. The stator 33 is disposed between the inner peripheral part of the impeller 31 and that of the turbine 32.

[Lock-Up Device 4]

The lock-up device 4 is disposed between the front cover assembly 2 and the torque converter body 3. The lock-up device 4 mechanically transmits a torque from the front cover assembly 2 to the turbine 32, and simultaneously, absorbs and attenuates torsional vibration inputted thereto. The lock-up device 4 is mainly composed of a piston 42 to which a friction member 41 is fixed, a drive plate 43, a driven plate 44 fixed to the turbine 32, and a damper part 45 including a plurality of springs. The lock-up device 4 has a heretofore known configuration, and hence, detailed explanation thereof will be omitted.

Other Preferred Embodiments

The present invention is not limited to the preferred embodiment described above, and a variety of changes or modifications can be made without departing from the scope of the present invention.

(a) The position and shape of the pocket portion are not limited to those in the aforementioned preferred embodiment. For example, the outer peripheral part of the engine-side distal end of the hub can be relatively largely processed by chamfering. In this case as well, rasped powder can be accommodated in the chamfered part.

(b) The surface of the hub can be hardened only at the knurled portion by heat treatment.

(c) In the aforementioned preferred embodiment, knurling has been described as an example of processing for forming the engaging portion of the hub. However, the processing for forming the engaging portion is not limited to knurling.

REFERENCE SIGNS LIST

1 Torque converter
2 Front cover assembly
3 Torque converter body
10 Front cover body
12 Inner tubular portion
12b Bottom portion
20 Hub
21 Knurled portion (engaging portion)
21a End surface
22 Pocket portion
23 Spline hole (coupling portion)

What is claimed is:

1. A front cover assembly for transmitting power inputted thereto to a torque converter body, the front cover assembly comprising:
    a front cover body having a disc shape, the front cover body including a tubular portion in a center part thereof, the tubular portion closed at one end thereof; and
    a hub having a tubular shape, the hub including an engaging portion integrated with at least part of an outer peripheral surface thereof, the hub including a hole disposed in an inner periphery of the hub to penetrate the hub in an axial direction, the engaging portion press-fitted to the tubular portion of the front cover body.

2. The front cover assembly according to claim 1, wherein the tubular portion has an inner peripheral surface formed by cutting.

3. The front cover assembly according to claim 1, wherein the hub has the engaging portion on a part thereof separated from a bottom portion of the tubular portion in an axial direction, and
    the hub includes a pocket portion on the outer peripheral surface thereof, the pocket portion disposed closer to the bottom portion of the tubular portion than the engaging portion, the pocket portion accommodating powder rasped in press-fitting the hub to the tubular portion.

4. The front cover assembly according to claim 3, wherein the engaging portion and the pocket portion are continuous in the axial direction.

5. The front cover assembly according to claim 3, wherein the pocket portion is an annular recess.

6. The front cover assembly according to claim 1, wherein the hub closely makes contact at an axial end surface thereof with a bottom surface of the tubular portion.

7. The front cover assembly according to claim 1, wherein the engaging portion is formed by knurling.

8. The front cover assembly according to claim 2, wherein the engaging portion of the hub has a higher surface hardness than the inner peripheral surface of the tubular portion.

\* \* \* \* \*